United States Patent Office 3,043,865
Patented July 10, 1962

3,043,865
PROCESS FOR RESOLVING A CYCLIC
HYDROXY ACID
Gérard Nominé, Noisy-le-Sec, and Jean Cérède, Dugny,
France, assignors, by mesne assignments, to Roussel-
UCLAF, S.A., Paris, France, a corporation of France
No Drawing. Filed May 7, 1959, Ser. No. 811,531
Claims priority, application France June 3, 1958
5 Claims. (Cl. 260—501)

The present invention relates to the respective dextro-rotary and levo-rotary antipodes of 1β-hydroxy-3-carboxyl - 6 - methoxy-9aβ-methyl - 1,2,3a,8,9,9a-hexahydro-Δ$^{3(3a)}$-benzo[e]indene having the structural formula:

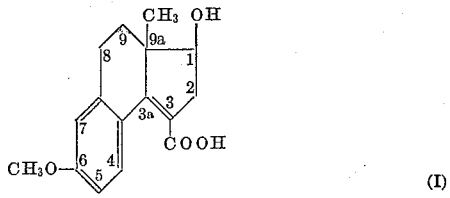

their intermediate amine addition salts with 1-(p-nitrophenyl)-2-amino-propane-1,3-diol, and the process resolving the antipodes.

It also relates to its two enantiomorphs as novel industrial products.

It is of great interest to have available a simple and inexpensive process for the resolution of compound I, which compound is useful as an intermediate in the synthesis of 19-norsteroids and other optically active steroid hormones. The process for producing 19-norsteroids from the racemic acid compound I is described by Chinn et al., "Abstract of Papers—134th Meeting of the American Chemical Society, 1958, 14–0." It is readily apparent that by resolving the racemic acid compound I it is possible to work with the desired enantiomorph at an early stage of the synthesis. The racemate of compound I has been described by D. K. Banerjee et al., J. Am. Chem. Soc., 78, 3769 (1956), under the name of 1β-hydroxy-8β-methyl-4,5 - (4'methoxy-benzo)-Δ$^{3(9)}$-hydrindene-3-carboxylic acid.

We have found that the racemic acid compound I can be resolved by the following procedure which consists essentially of forming a salt with an optically active organic base, namely L-(+)-threo-1-(p-nitrophenyl)-2-amino-propane-1,3-diol in the presence of a polar organic solvent, and adding a second organic solvent adapted to make one of the salts of the two enantiomorphs of compound I become relatively insoluble, so that it becomes possible to separate and then liberate the two enantiomorphs by acidification. Lower alkanols, such as methanol or ethanol, are preferably used as polar organic solvents, the second organic solvent being, preferably, isopropyl ether.

This process makes it possible to separate the two enantiomorphs rapidly and with good yields, giving the desired enantiomorph substantially free of its optical antipode. In addition, it is very economical. The L-(+)-threo-1-(p-nitrophenyl)-2-amino-propane-1,3 - diol which is used as the resolving agent is a valueless by-product of the synthesis of chloramphenicol and is obtained by the process described by Velluz et al., Bull. Soc. Chim., 1953, page 342.

It has the structural formula

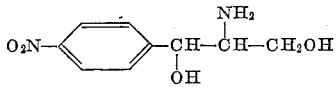

and the following physical characteristics: M.P.=162–163° C., [α]$_D^{20}$=+28°±2(c.=1% in .05 N hydrochloric acid). It may be recovered by alkalizing the acid mother liquors from which the enantiomorphs of compound I have been precipitated.

By this process, both the dextro-rotary enantiomorph of 1β-hydroxy-3-carboxy-6-methoxy-9aβ-methyl - 1,2,3a,8,9,-9a-hexahydroΔ$^{3(3a)}$-benzo[e]indene, substantially f r e e from its optical antipode, and the levo-rotary enantiomorph of 1β-hydroxy-3-carboxy-6-methoxy-9aβ-methyl-1,2,3a,8,9,9a - hexahydro-Δ$^{3(3a)}$-benzo[e]indene, substantially free from its optical antipode, can be obtained in good yields.

The following examples illustrate the invention without limiting the same. More particularly, it is possible to vary the nature of the solvents or decompose the salts of compound I with an acid other than hydrochloric acid without departing from the scope of the invention. Moreover, the salts of the enantiomorphs of compound I may be formed with D-(—)-threo-1-(p-nitrophenyl)-2-amino-propane-1,3-diol, but this renders the process somewhat less economical.

The temperatures given are in degrees centigrade. The melting points are the instantaneous melting points as determined on a Maquenne block.

EXAMPLE

*Isolation of the Dextro-Rotary and Levo-Rotary Enantiomorphs of 1β - Hydroxy-3-Carboxy-6-Methoxy-9aβ-Methyl-1,2,3a,8,9,9a-Hexahydro-Δ$^{3(3a)}$Benzo[e]indene*

(A) FORMATION OF THE COMPLEX WITH L-(+)-THREO-1-(p-NITROPHENYL) - 2 - AMINO - PROPANE-1,3-DIOL 7.31 gm. (0.0345 mol.) of L-(+)-threo-1-(p-nitrophenyl)-2-aminopropane-1,3-diol and 60 cc. of methanol are added to 9 gm. (0.0328) of racemic 1β-hydroxy-3-carboxy-6-methoxy-9aβ-methyl-1,2,3a, 8,9,9a-hexahydro-Δ$^{3(3a)}$-benzo[e]indene, prepared according to D. K. Banerjee, J. Am. Chem. Soc., 78, 3769 (1956), the container is closed and the contents are agitated for about one-half hour until complete solution has taken place. The amino-propanediol is in a slightly molar excess with respect to the racemic benzo[e]indene. The resulting yellow solution is allowed to stand at room temperature for one-half hour and then 210 cc. of isopropyl ether are slowly added, accompanied by agitation. After all the ether has been added, crystallization is initiated by scratching and the mixture is allowed to stand for one hour in the dark. The crystals of the salt formed by the dextro-rotary base with the levo-rotary acid are filtered off at room temperature and are then triturated successively with 20 cc. and 15 cc. of a mixture of methanol and isopropyl ether in a ratio of 1:3.5. The wet crystals are then dried in a vacuum over P$_2$O$_5$. 7.9 gm. of yellowish-green crystals are obtained. M.P.=120–122° C., [α]$_D^{20}$=—31.5°±1(c.=1% in methanol). For analysis, the product is recrystallized from water, whereby a product solvated with one-half molecule of water is obtained which is in the form of pale yellow prisms or platelets which are soluble in water, methyl or ethyl alcohol and acetone, poorly soluble in benzene or chloroform, insoluble in isopropyl ether, and decompose in dilute aqueous acids. M.P.=145–149° C., [α]$_D^{20}$=—35° (c.=1% in methanol). Recrystallization yield: 64%.

*Analysis.*—C$_{25}$H$_{30}$O$_8$N$_2$, ½ H$_2$O, mol. wt. 495.52. Calculated: C, 60.59%; H, 6.3%; N, 5.65%. Found: C, 60.4%; H, 6.2%; N, 5.7%.

Loss of weight at 110° C.=1.8% (calculated 1.82%).

This compound is not described in the literature and is the hemihydrate of the acid addition salt of levo-rotary 1β-hydroxy-3-carboxy-6-methoxy-9aβ-methyl - 1,2,3a,8,9,-9a-hexahydro-Δ$^{3(3a)}$-benzo[e]indene and L-(+)-threo-1-(p-nitrophenyl)-2-amino-propane-1,3-diol.

(B) ISOLATION OF LEVO-ROTARY 1β-HYDROXY-3-CARBOXY-6-METHOXY - 9aβ - METHYL - 1,2,3a,8,9,9a -HEXAHYDRO-Δ³⁽³ᵃ⁾-BENZO[E]INDENE 7 gm. of the salt obtained in A above are dissolved at 40–50° C. in 250 cc. of water, and 22.5 cc. of 1 N hydrochloric acid are then added to the solution while stirring. The levo-rotary acid begins to precipitate. The solution is allowed to stand for one hour at room temperature and is then filtered. The precipitate is filtered off and triturated twice in 25 cc. of water. The precipitate is then dried in a vacuum over $P_2O_5$. 3.71 gm. of the raw levo-rotary acid are obtained which are then recrystallized from 60 cc. methanol containing 20% water. The yield is 86% based on the amount of racemic acid. The novel compound, levo-rotary 1β-hydroxy-3-carboxy-6-methoxy-9aβ-methyl-1,2,3a,8,9,9a-hexahydro - Δ³⁽³ᵃ⁾ - benzo[e]indene substantially free from its optical antipode, which is not described in the literature, is obtained in the form of white needles and is soluble in dilute alkaline solutions, alcohol, ethyl ether and acetone, poorly soluble in benzene and chloroform, and very slightly soluble in water, dilute acidic solutions and isopropyl ether. M.P.=223–225° C., $[\alpha]_D^{20} = -120°$ (c.=1% in methanol).

*Analysis.*—$C_{16}H_{18}O_4$, mol. wt. 274.30. Calculated: C, 70.05%; H, 6.61%. Found: C, 70.0%; H, 6.6%.

By rendering the mother liquor from the acidification step alkaline, the resolving reagent can be recovered. The yield from this recovery procedure is about 90% of the starting L-(+)-threo-1-(p-nitrophenyl)-2-amino-propane-1,3-diol.

(C) ISOLATION OF DEXTRO-ROTARY-1β-HYDROXY-3-CARBOXY-6-METHOXY-9aβ-METHYL-1,2,3a,8,9,9a-HEXAHYDRO-Δ³⁽³ᵃ⁾-BENZO[E]INDENE

The solvents in the mother liquor from the filtration step in the preparation of the salt of the levo-rotary enantiomorph described under A above are distilled off in vacuo on the water bath. The yellow gummy residue, the acid addition salt of dextro-rotary 1β-hydroxy-3-carboxy-6-methoxy-9aβ-methyl - 1,2,3a,8,9,9a-hexahydro-Δ³⁽³ᵃ⁾-benzo[e]indene and L-(+) - threo - 1 - (p-nitrophenyl)-2-amino-propane-1,3-diol, is then dissolved in 60 cc. water and 20 cc. 1 N hydrochloric acid are added dropwise to the solution while stirring. The dextro-rotary 1β-hydroxy-3-carboxy-6-methoxy-9aβ-methyl - 1,2,3a,8,9,-9a-hexahydro-Δ³⁽³ᵃ⁾-benzo[e]indene precipitates out in finely divided form. The mixture is allowed to stand for a few minutes, the preciptate is filtered off, triturated three times with 25 cc. water and dried in vacuo. 4.61 gm. of the raw product having a M.P. of 214° C. are obtained. By recrystallization from 80% methanol, 3.98 gm. (representing a yield of 88.5% of the dextro-rotary 1β-hydroxy-3-carboxy-6-methoxy-9aβ- methyl - 1,2,3a,8,9,9a-hexahydro-Δ³⁽³ᵃ⁾-benzo[e]indene substantially free from its optical antipode are obtained, having a M.P. of 223–225° C., $[\alpha]_D^{20} = +118°$ (c.=1% in methanol). The dextro-rotary compound, like its levo-rotary enantiomorph, is obtained in the form of white needles and has the same solubility properties. The resolving reagent is recovered in the manner described under B above.

While we have illustrated various specific embodiments of our invention, it will be readily apparent to one skilled in the art that the invention herein described is not limited to these embodiments and that various changes and modifications may be made without departing from the spirit of the invention or the scope of the appended claims.

We claim:
1. The process of resolving racemic 1β-hydroxy-3-carboxy - 6 - methoxy - 9aβ - methyl - 1,2,3a,8,9,9a - hexahydro-Δ³⁽³ᵃ⁾-benzo[e]indene into its levo-rotary and dextro-rotary enantiomorphs which comprises dissolving said racemic benzo[e]indene in a solution of L-(+)-threo-1-(p-nitrophenyl)-2-amino-propane-1,3-diol in a slightly molar excess with respect to said benzo-[e]indene in a lower alkanol at about room temperature to form an acid addition salt of said benzo[e]indene and said aminopropanediol, adding to said solution a second organic solvent selected from the group consisting of chloroform and isopropyl ether, crystallizing the acid addition salt of the levo-rotary enantiomorph at about room temperature and separating the precipitated crystals from the mother liquor.

2. The process of claim 1, wherein said lower alkanol is methanol.

3. The process of claim 1, wherein said second organic solvent is isopropyl ether.

4. The process of resolving racemic 1β-hydroxy-3-carboxy - 6 - methoxy - 9aβ - methyl - 1,2,3a,8,9,9a - hexahydro-Δ³⁽³ᵃ⁾-benzo[e]indene into its levo-rotary and dextro-rotary enantiomorphs which comprises dissolving said racemic benzo[e]indene in a solution of L-(+)-threo-1-(p-nitrophenyl)-2-amino-propane-1,3-diol in a slightly molar excess with respect to said benzo[e]indene in a lower alkanol at about room temperature to form an acid addition salt of said benzo[e]indene and said aminopropanediol, adding to said solution a second organic solvent selected from the group consisting of chloroform and isopropyl ether, crystallizing the acid addition salt of the levo-rotary enantiomorph at about room temperature, separating the precipitate crystals from the mother liquor, dissolving said crystals in water, acidifying to precipitate the levo-rotary enantiomorph and separating said levo-rotary enantiomorph.

5. The process of resolving racemic 1β-hydroxy-3-carboxy - 6 - methoxy - 9aβ - methyl - 1,2,3a,8,9,9a - hexahydro-Δ³⁽³ᵃ⁾-benzo[e]indene into its levo-rotary and dextro-rotary enantiomorphs which comprises dissolving said racemic benzo[e]indene in a solution of L-(+)-threo-1-(p-nitrophenyl)-2-amino-propane-1,3-diol in a slightly molar excess with respect to said benzo[e]indene in a lower alkanol at about room temperature to form an acid addition salt of said benzo[e]indene and said aminopropanediol, adding to said solution a second organic solvent selected from the group consisting of chloroform and isopropyl ether, crystallizing the acid addition salt of the levo-rotary enantiomorph at about room temperature, separating the precipitated crystals from the mother liquor, evaporating said mother liquor, separating the precipitated acid addition salt of the dextro-rotary enantiomorph, dissolving said acid addition salt in water, acidifying to precipitate the dextro-rotary enantiomorph and separating said dextro-rotary enantiomorph.

References Cited in the file of this patent
UNITED STATES PATENTS

| | | |
|---|---|---|
| 2,921,959 | Amiard | Jan. 16, 1960 |
| 2,991,307 | Amiard et al. | July 4, 1961 |

FOREIGN PATENTS

| | | |
|---|---|---|
| 785,014 | Great Britain | Oct. 23, 1957 |

OTHER REFERENCES

Banerjee et al.: "Jour. Am. Chem. Soc.," vol. 78, pp. 3769–75 (1956). (Copy in Pat. Off. Scientific Library.)